(12) United States Patent
Miller et al.

(10) Patent No.: US 8,457,402 B2
(45) Date of Patent: Jun. 4, 2013

(54) METHOD FOR RATING AREAS IN VIDEO FRAMES

(75) Inventors: Ofer Miller, Singapore (SG); Amir Segev, Raanana (IL)

(73) Assignee: Artimedia Pte Ltd., Singapore (SG)

( * ) Notice: Subject to any disclaimer, the term of this patent is extended or adjusted under 35 U.S.C. 154(b) by 182 days.

(21) Appl. No.: 13/131,264

(22) PCT Filed: Nov. 23, 2009

(86) PCT No.: PCT/IL2009/001097
§ 371 (c)(1),
(2), (4) Date: May 25, 2011

(87) PCT Pub. No.: WO2010/067350
PCT Pub. Date: Jun. 17, 2010

(65) Prior Publication Data
US 2012/0017238 A1    Jan. 19, 2012

(30) Foreign Application Priority Data
Dec. 10, 2008  (IL) .......................................... 195848

(51) Int. Cl.
*G06K 9/34* (2006.01)
*G06K 9/00* (2006.01)

(52) U.S. Cl.
USPC ...................................................... 382/173

(58) Field of Classification Search
USPC ................. 382/103, 164, 173, 190, 218–220,
382/224; 348/42–60; 725/32; 375/240.01,
375/240.08, 240.16
See application file for complete search history.

(56) References Cited

U.S. PATENT DOCUMENTS

| 6,297,853 | B1 | 10/2001 | Sharir et al. |
| 6,661,918 | B1 * | 12/2003 | Gordon et al. ................. 382/173 |
| 6,738,424 | B1 * | 5/2004 | Allmen et al. ........... 375/240.08 |

(Continued)

FOREIGN PATENT DOCUMENTS
EP         1 463 317         9/2004

OTHER PUBLICATIONS

Kang et al., Development of Expert System for Extraction of the Objects of Interest, *Expert Systems With Applications*, vol. 36, No. 3, Apr. 1, 2009, pp. 7210-7218.
International Search Report mailed Mar. 16, 2010 in International Application PCT/IL2009/001097, filed Nov. 23, 2009.

(Continued)

*Primary Examiner* — Amir Alavi
(74) *Attorney, Agent, or Firm* — Novick, Kim & Lee, PLLC; Harold L. Novick

(57) ABSTRACT

A method is provided for rating areas in video frames. The method comprises: (a) providing a video signal comprising a plurality of consecutive video frames; (b) selecting a frame from among these frames and indentifying a first plurality of objects comprised in the selected frame; (c) upon comparing the selected frame with other frames, dividing the first plurality of the objects into a second plurality of background objects and a third plurality of foreground objects; (d) dividing objects of the third plurality of foreground objects into one or more connected components, where a connected component comprises group(s) of pixels wherein a change in each of these pixels is associated with a change in each of the remaining pixels of the respective group(s); and (e) associating an interest level with the connected components based upon a pre-determined set of criteria, thereby providing a rating of areas comprised within the video signal.

13 Claims, 2 Drawing Sheets

U.S. PATENT DOCUMENTS

| | | | |
|---|---|---|---|
| 6,999,620 B1* | 2/2006 | Harville | 382/173 |
| 7,203,356 B2* | 4/2007 | Gokturk et al. | 382/154 |
| 7,227,893 B1* | 6/2007 | Srinivasa et al. | 375/240.08 |
| 7,230,653 B1 | 6/2007 | Overton et al. | |
| 7,978,917 B2* | 7/2011 | Lei et al. | 382/224 |
| 2004/0032906 A1 | 2/2004 | Lillig | |
| 2004/0194128 A1 | 9/2004 | McIntyre et al. | |
| 2006/0217110 A1 | 9/2006 | Othmer | |
| 2008/0004962 A1 | 1/2008 | Muthukrishnan et al. | |
| 2008/0126226 A1 | 5/2008 | Popkiewicz et al. | |
| 2012/0017238 A1* | 1/2012 | Miller et al. | 725/32 |
| 2012/0148093 A1* | 6/2012 | Sharma | 382/103 |

OTHER PUBLICATIONS

Miller et al., Automatic Adaptive Segmentation of Moving Objects Based on Spatio-Temporal Information, *Digital Image Computing (DICTA 2003)*, Date: unknown; pp. unknown; this reference is discussed in the present specification beginning on p. 6, line 10.

Navon et al., Color Image Segmentation Based on Adaptive Local Thresholds, *Image and Vision Computing 23*, 2005, pp. 69-85; this reference is discussed in the present specification beginning on p. 4, line 12.

Y. Pritch, A. Rav-Acha, and S. Peleg. "Nonchronological Video Synopsis and Indexing," IEEE Trans. PAMI, vol. 30, No. 11, Nov. 2008, pp. 1971-1984.

* cited by examiner

METHOD FOR RATING AREAS IN VIDEO FRAMES

This application is a 371 of PCT/IL09/01097 filed on Nov. 23, 2009.

FIELD OF THE INVENTION

The present invention relates in general to the field of image processing, and in particular to methods for inserting messages into a video signal.

BACKGROUND OF THE INVENTION

The image processing is used in various fields of the industry ranging from high quality cameras that are used for surveillance to inexpensive webcams that are used for personal teleconferences from home, as well as in TV and mobile telephones. One important use of IP (Image Processing) is in the field of messaging such as advertising. Messages/advertisements have become an inseparable part of our watching experience; whether they are direct ones like posters of companies that sponsor sport events or indirect ones like repeated use of certain products in movies and TV programs. Companies invest a lot of money in those advertisements (in the 2008 Beijing Games, each company sponsoring the games paid an average of $72 million). Unfortunately, in many times the targets of the messages (e.g. advertisements) are not met, whether in sports events where advertisements are written in one language while a substantial part of the viewers (whether present at the event or watch it on TV) do not understand this language or the advertised products are of no interest to the viewers, or in cases where the messages relate to old or non-existing products, e.g. in repeated broadcasts of movies and TV programs. With the help of IP it is possible to solve some of these problems by modifying and/or adding to existing video signals and/or live video signals in order to get the best suited message to the viewer. In addition, video adds another dimension to the traditional messaging in the web, i.e. the temporal dimension. Due to the fact that the message/advertisement may be changed within a video signal rather rapidly, it has become possible to adjust the incorporated messages/advertisements on the fly, where such adjustments can be a matter of changes in volume, type, size, frequencies and the like associated with the messages/advertisements. In addition, IP networks enable nowadays the user to utilize the video content as a platform for inserting messages on top of or within the video signals. Several attempts to answer the needs for tailored messages/advertisements have been made in the art, and following are a number of examples thereof.

U.S. Pat. No. 6,297,853 describes a system and method for video transmission of active events such as sport events, having in the background physical images in designated targets. The physical images are electronically exchanged with pre-selected virtual images. This publication relies on detecting and identifying targets by using one or more of the following attributes: geometry—such as the physical configuration of billboards, texture of slogans and graphics—such as for example in posters, character recognition, field lines-which serve as references for designating free court areas, standard objects—such as backboard or basket.

U.S. Pat. No. 7,230,653 discloses insertion of a real time image in a video signal. The system utilizes a three-dimensional model of at least one target area within a site for identifying the target area within an original video image of the site, and for rendering a target image and inserting it into the target area of the video image. The model is rendered from the position and angle of a camera that generated the video image. By using a three dimensional model of the site to generate the target image, the resulting image with the inserted target material appears more realistic.

The above publications and others that are known in the art are concerned primarily in how to insert images at the background of a video signal, but provide only a partial and not a sufficiently adequate solution to one of the problems which the present patent seeks to solve, being, how to identify areas within a frame in a video signal which can be used for adding static and/or dynamic images thereat.

SUMMARY OF THE INVENTION

It is therefore an object of the present invention to provide a method for identifying areas within a frame comprised in a video signal which for inserting one or more visual messages without causing a substantial impact upon the viewing quality of the modified video signal. It should be noted that inserting one or more visual messages may also be carried out as a virtual insertion, whereby the insertion is made on top of the video signal rather than (or in addition to) within the video signal.

It is another object of the present invention to provide a method for classifying objects which appear in a video signal into foreground objects and background objects, and to provide areas of different interest levels within these objects. It is still another object of the present invention to provide a method for inserting one or more visual messages in designated areas comprised in objects that appear in the foreground of the frame.

It is yet another object of the present invention to provide a method to allow real time identification of such areas for inserting one or more visual messages in a live broadcast of a video signal.

According to a first embodiment of the present invention there is provided a method for rating areas comprised in video frames included in a video signal. The method comprises the steps of:

(a) providing a video signal comprising a plurality of consecutive video frames, such a video signal may also be a signal of a live broadcast;

(b) selecting a frame from among the plurality of consecutive video frames, being a selected frame, and identifying a first plurality of objects comprised in the selected frame by using one of the methods that are known in the art per se (e.g. per the method described in "Color Image Segmentation Based on Adaptive Local Thresholds", Elsevier, Image and Vision Computing 23 (2005) pp. 69-85);

(c) comparing the selected frame with one or more of the other consecutive frames and dividing a plurality of the objects into a second plurality of background objects and a third plurality of foreground objects;

(d) dividing at least one object from among the third plurality of foreground objects into one or more connected components, where the connected component comprises at least one group of pixels and wherein a change in each of the pixels comprised in the at least one group of pixels is associated with a change in each of the remaining pixels of that at least one group of pixels; and (e) associating an interest level with the one or more connected components based upon a pre-determined set of criteria (e.g. sharpness, location within a frame, relative size, movement, type of content, significance to the potential viewers, viewers interest and the like), thereby providing a rating of areas comprised within the plurality of video frames.

In accordance with a preferred embodiment of the present invention, the method provided further comprises a step of inserting one or more visual messages into one or more areas based upon the interest level associated therewith.

The term "visual message" as used herein and throughout the description and claims should be understood to encompass text messages, images and/or video clips.

As will be appreciated by those skilled in the art, the term "inserting one or more visual messages" should be understood to encompass both options of inserting the visual messages within the video signal and/or inserting the visual message virtually on top of the video signal.

By another embodiment of the invention, the one or more of the other consecutive frames that is/are compared in step (c) with the selected frame, does/do not have to be the frames that immediately proceed the selected frames, e.g. one or more frames may be skipped.

In accordance with an embodiment of the present invention, step (c) of the method provided comprises comparing the selected frame with one or more of the other consecutive frames and deriving from the first plurality of the objects comprised in the selected frame, a second plurality of background objects and a third plurality of foreground objects.

According to another embodiment of the present invention, the method provided further comprises repeating steps (b) to (e) for a number of times, and selecting for every repetition another frame to be the selected frame, where the newly selected frame proceeds the previously selected frame in that plurality of consecutive video frames. This embodiment allows the process of identifying objects and rating the interest level of areas comprised in the identified objects to be preferably executed along the whole (or at least the major part of the) video signal.

As recited in step (c) of the method provided, a second plurality of background objects and a third plurality of foreground objects are derived from the plurality of the objects identified. There are numerous ways that are known in the art per se for distinguishing between foreground objects and background objects, and as will be appreciated by those skilled in the art the present invention is not limited to any specific method. Still, as an example, one of these methods is described in the article authored by O. Miller, A. Averbuch and Y. Keller and named "Automatic Adaptive Segmentation of Moving Objects Based on Spatio-Temporal Information", Digital Image Computing (DICTA 2003), Sydney, AU.

For the sake of simplicity, one may use a criterion whereby an object of which at least part exhibited a relative motion between two consecutive frames of the video signal, would be considered to be a foreground object, whereas an object which has not exhibited such a motion within the video signal, would be considered as being a background object. However, one should bear in mind that this guiding criterion is a considerable simplification of the criteria that should be used in order to properly differentiate between foreground and background objects for actual video signals.

According to yet another embodiment of the present invention step (d) of the method provided further comprises dividing at least one object from among the second plurality of background objects into one or more connected components, thereby enabling the rating of areas comprised in objects included in that second plurality of background objects.

In accordance with another embodiment of the invention the one or more connected components of the at least object selected from among the third plurality of foreground objects consists of a group of pixels, and wherein at least one pixel out of that group of pixels has changed its relative location compared with that object as seen in one or more other video frames belonging to that plurality of consecutive video frames.

According to still another embodiment of the present invention, when an object has been classified as a foreground object, it retains this classification in each of the proceeding video frames that the object would appear within, for as long as that sequence of frames lasts (i.e. throughout a scene). As will be appreciated by those skilled in the art, the method provided by the present invention also encompasses cases where the object(s) "leaves" the video frame (i.e. not shown in the one or more proceeding frames) and returns later, as well as cases where the movement of the identified object results in a change in the object's own properties (e.g. change from front to profile view, from sitting position to a standing position, etc.), and cases where there are changes in the video shooting parameters which influence the identified object properties (e.g. movement of the camera, zoom in, zoom out, change of shooting angle, etc.).

By another embodiment of the invention an object that belongs to the third plurality of foreground objects is re-classified as a member of said second plurality of background objects provided that no criterion for classifying an object as a foreground object are met for said object for at least a pre-defined number of consecutive video frames. A non limiting example is that the criteria for a foreground object is that the object has exhibited motion in one of the preceding frames, and stayed still for at least a pre-defined number of frames thereafter. Thus, according to this embodiment, the classification of the object would change thereafter from being classified as a foreground object to being classified as a background object.

According to another embodiment of the present invention the method provided further comprises a step of identifying areas comprised within objects included in the plurality of video frames that their respective rating has been changed during the video signal. Preferably, that change in the rating is of at least a pre-defined number of levels of interest. This embodiment allows the user to change the location of one or more visual messages according to changes in the rating of the identified areas.

According to yet another embodiment of the present invention, the method provided further comprises a step of matching at least one object from among the first plurality of objects to one or more pre-defined characterizing classes. Preferably, the method further comprises a step of inserting one or more visual messages at one or more areas associated with the at least one object that matches the one or more pre-defined characterizing classes, and wherein the insertion is made in accordance with the respective level of interest of that area and the characterizing class with which the at least one object has been matched. By this embodiment one may apply, preferably under real time or near real time conditions, smart advertising to objects, e.g. by matching the product being advertised with the object it is advertised on.

According to yet another aspect of the present invention there is provided a computer readable medium storing a computer program for executing a set of instructions by a computer system comprising one or more computer processors a process for rating areas comprised in video frames included in a video signal, the process comprising: (a) selecting a frame from among a plurality of consecutive video frames comprised in a video signal provided, that frame being a selected frame; (b) indentifying a first plurality of objects comprised in the selected frame; (c) upon comparing the selected frame with one or more of the plurality of consecutive video frames, deriving a second plurality of background objects and a third plurality of foreground objects; (d) dividing at least one object from among the third plurality of foreground objects into one or more connected components; and (e) associating an interest level with the one or more connected components based upon a pre-determined set of criteria, thereby providing a rating for areas comprised within the plurality of video frames.

By another embodiment of this aspect of the invention, the process further comprises a step of inserting one or more visual messages into one or more areas comprised within the plurality of video frames while complying with one or more pre-defined rating criteria.

By yet another embodiment of this aspect of the invention, step (c) of the process comprises comparing the selected frame with one or more of the other consecutive frames and deriving from the first plurality of the objects comprised in the selected frame, a second plurality of background objects and a third plurality of foreground objects.

According to yet another embodiment of this aspect of the present invention the process further comprises a step of matching at least one object to one or more pre-defined characterizing classes, and inserting the one or more visual messages at one or more areas associated with that at least one object in accordance with its respective level of interest and the characterizing class to which that at least one object has been matched.

DETAILED DESCRIPTION OF THE INVENTION

A better understanding of the present invention will now be obtained when the following non-limiting detailed description is considered in conjunction with the following drawings.

Figure 1:
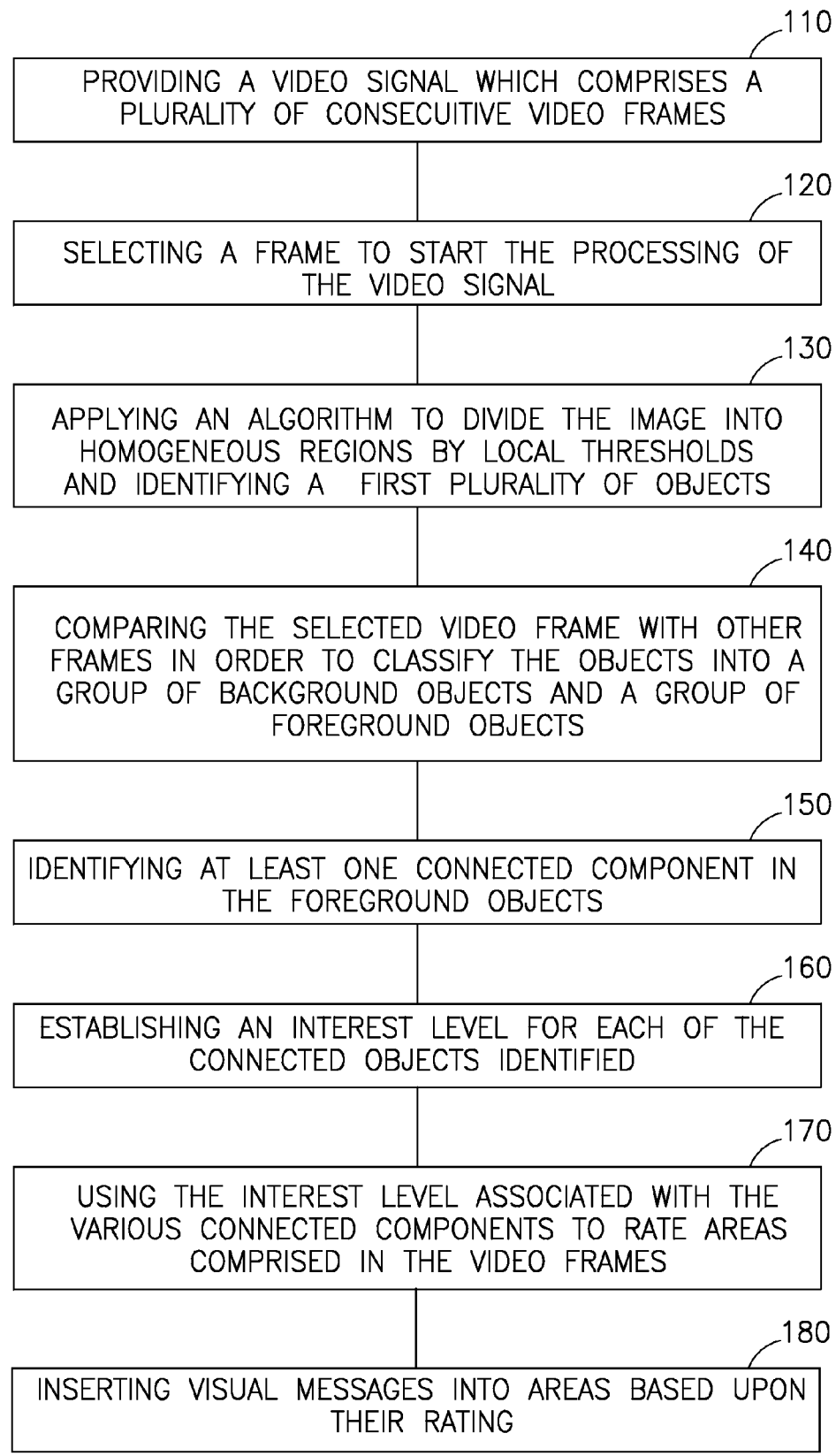
FIG. 1—presents a block diagram of a method for carrying out an embodiment of the present invention.

Let us first consider FIG. 1 which illustrates a flow chart of an embodiment of the method carried out according to the present invention. First, (step 110) a video signal is provided which comprises a plurality of consecutive video frames. As will be appreciated, the present invention should not be considered as being restricted to any particular type of a video signal that complies with one broadcast standard or another such as NTSC (National Television Standards Committee) which is common in North and Central America, PAL (Phase Alteration Line) which is the formal European standard or SECAM (Systeme Electronic Pour Couleur Avec Memoire) that is the broadcast standard for France, Russia, and parts of Africa and Eastern Europe. The video signal may also be a live signal being broadcasted (e.g. a live NBA game or news) or be an edited broadcast (e.g. movies or TV programs). A frame is then selected (step 120) from among the plurality of consecutive video frames which comprise the signal, and this frame will be used to start the processing of the video signal in accordance with the present invention. When the method is applied on a typical video signal, the selected frame is preferably the first video frame from among the frames.

Once a frame has been selected, any one or more of several algorithms may be applied on the selected frame one or more times, in order to identify a first plurality of objects that appear in that frame (step 130). As described before, one such algorithm is described in details in "Color Image Segmentation Based on Adaptive Local Thresholds" by Ety Navon, Ofer Miller and Amir Averbuch, Elsevier, Image and Vision Computing 23 (2005) pp. 69-85. The underlying principle in that publication is division of the image into homogeneous regions by local thresholds, where the number of thresholds and their values are adaptively derived by an automatic process, as local information is taken into consideration.

Upon identifying the first plurality objects, the selected video frame is compared with other video frames comprised in that video signal in order to classify the first plurality of objects detected by applying step 130, into two major groups: the first being a group of background objects, while the other group is of foreground objects (step 140). One of the methods that may be used in this step is described in the article of O. Miller, A. Averbuch and Y. Keller "Automatic Adaptive Segmentation of Moving Objects Based on Spatio-Temporal Information, Digital Image Computing (DICTA 2003), Sydney, AU. The number of video frames used in order to distinguish whether an object is a foreground object or a background object, are not pre-determined, and may vary from time to time. In the comparison process proceeding and/or preceding video frames may be used. In addition several additional criteria may be used to decide if an object belongs to the group of background objects or to the group of foreground objects. For example: texture of the object, edges, lightness, and the like.

Next, one or more connected components are identified in the objects that had been classified as a foreground objects (step 150). A connected component consists of at least one group of pixels characterized by the fact that a change in each of the pixels comprised in the at least one group of pixels is associated with a change in each of the remaining pixels of that at least one group of pixels. Thus, when at least one pixel out of that group of pixels changes its relative location in one or more of the video frames, that group is considered to have moved. An example for such an object and its connected components could be a human figure (being the object) while his arms, hands, legs, head etc. being the corresponding connected components.

For each of the identified connected component, an interest level is established (step 160). The criteria for establishing the interest level may be any combination of the following parameters: relative location in the frame, color, texture, focus, amount of light, amount of movement and the like. Then the interest level that has been associated with each such connected component is used to rate areas comprised in these video frames (step 170). The areas being rated can be one or more joint connected components which are preferably part of the objects classified as foreground objects, but may also belong to objects which are currently classified as background objects.

Next, one or more visual messages are inserted into rated areas (step 180). Naturally, the insertion of these visual messages will not be to each of the rated areas, but rather use the rating of each of the areas to determine if (and preferably which) visual message should be inserted thereat. Thus, such visual messages could be inserted into areas that have been rated as areas of a relatively low interest level (e.g. less than a pre-defined threshold value), whereas in areas that were rated as being of a high level of interest, no such visual messages will be inserted. Preferably, a visual message could suit a differently rated area. For example, football player shirts may be a suitable place to insert a text message or even an image but not a very good place to locate a video clip.

Once step 180 has been carried out, or in the alternative prior to carrying out step 180, a deferent video frame may be selected from among the frames comprised in the video signal provided, and the process (steps 130 to 170/180) may then be repeated with this newly selected video frame, as the selected frame.

When a scene changes, the process preferably starts once again without taking into consideration which of the objects were included in the previous scene among the foreground objects and which in the background objects.

Figure 2:
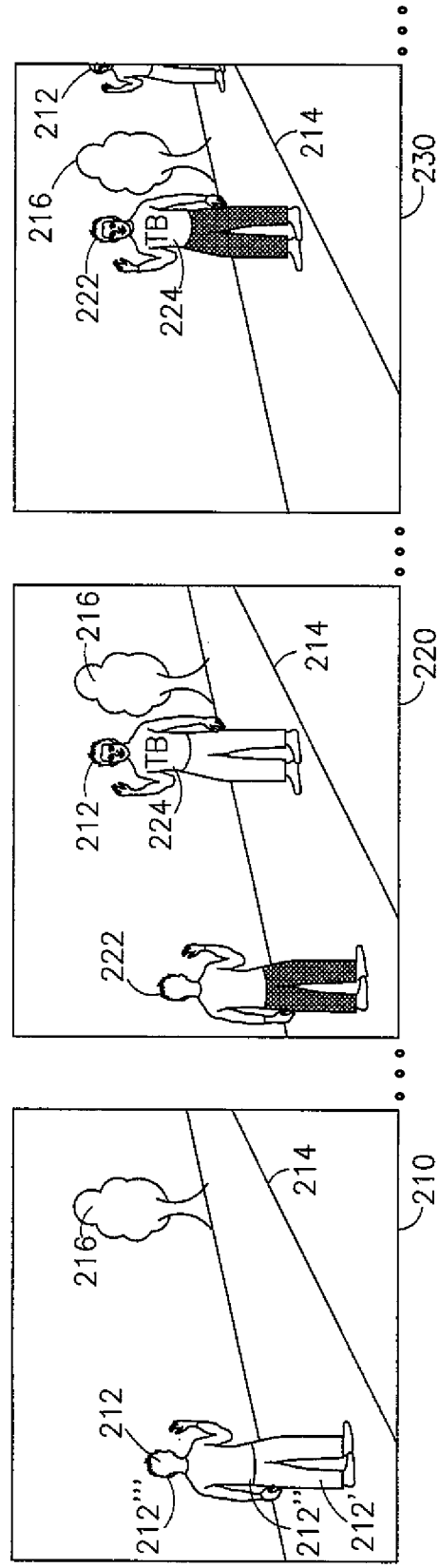
FIG. 2—presents a plurality of video frames for demonstrating ways of implementing the present invention.

Let us now turn to FIG. 2 which demonstrates an example of a plurality of consecutive video frames (200) the video signal has N number of video frames, but for the sake of simplicity only three of them are illustrated in this FIG. 2 in order to demonstrate an embodiment of the present invention. Starting with the selected video frame 210 (as explained in connection with step 120 of FIG. 1), as may be seen the frame comprises 3 objects. An image of a first person (212) walking along a road (214) towards a tree (216). By comparing this frame to its proceeding frames (not shown in this FIG.) it has been established that the image of the first person (212) is a foreground object, whereas the tree (216) and the road (214) are background objects. Next, the person's image (212) is divided into a number of connected components to allow associating each of them with a respective interest level. The connected components selected in the person's image are each of the legs (212') the shirt (212") and the person's head (212'''). The head and the legs are considered as areas of high interest due to the fact that they are involved with a considerable amount of motion (e.g. the image of person's legs move while walking, and the head is shaken while walking), whereas the shirt of the person's image remains essentially unchanged, hence it will be rated as a low interest area. Once the shirt has been established as being an area of low interest, it means that it is a candidate to insert a visual message thereat, preferably a text type of a visual message.

Now, let us consider frame 220 which is not the one that proceeds 210, but taken few frames later.

In frame 220 one may see the same tree (216), the same road (214) and the image of the same first person (212) but here it is located at a deferent place relatively to the background objects. A careful look at the image of the first person reveals that apart from the change in the image location, there are two other changes associated with that image. The first is that a visual message (224) has been inserted on the shirt and the other is that the first man image has changed his position and is now standing in front of the camera (as opposed to the profile position in frame 210). The method provided is adapted to take into consideration certain changes of the objects such as the above-described change, whether they are caused by a movement of the object itself or whether they are caused by a change in the shooting parameters (zoom in, zoom out etc). In frame 220 one may also note that another image of a man (222) has joined in. The second man image (222) is also an object that belongs to the plurality of foreground objects and also the shirt is a low interest rated area but due to certain parameters it is not rated as a good candidate for inserting the visual message as the area of the image of first man shirt.

Frame 230 is a frame taken several frames following frame 220 but still belongs to the same scene as the above discussed preceding claims. In this frame the image of the first man (212) is about to leave the frame hence the rating of his shirt area is about to change and at the same frame 230 the image of the second person is now located at the center of the frame hence the shirt area rating has changed, and a virtual massage (224) may be inserted there at (whether it is the same visual message that was previously presented on the shirt of the person (212) image or a different one.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention. For example, the method may further include a step of identifying a change in the area's rating and in response to that change adopt the visual message to the new rating, or the rating of the area may depend on the type of the object, and the like. In addition, although the description relates to the insertion of visual messages in areas that are referred to herein as low interest areas, i.e. areas which are of less interest to the viewer and therefore can be used for insertion of such visual messages without impacting substantially the viewing experience, still such areas may be defined by others to be areas of high interest (e.g. interest for inserting the visual messages) and the threshold will be determined accordingly, all without departing from the scope of the present invention.

It should be understood that features described with respect to one embodiment may be used with other embodiments and that not all embodiments of the invention have all of the features shown in a particular figure. Variations of embodiments described will occur to persons of the art. Furthermore, the terms "comprise," "include," "have" and their conjugates, shall mean, when used in the claims, "including but not necessarily limited to." The scope of the invention is limited only by the following claims.

The invention claimed is:

1. A method for rating areas comprised in video frames included in a video signal, and comprising:
    (a) providing a video signal comprising a plurality of consecutive video frames;
    (b) selecting a frame from among said plurality of consecutive video frames, being a selected frame, and identifying a first plurality of objects comprised in said selected frame;
    (c) upon comparing said selected frame with one or more other of said plurality of consecutive frames, dividing a plurality of said objects into a second plurality of background objects and a third plurality of foreground objects;
    (d) dividing at least one object from among said third plurality of foreground objects into one or more connected components, where the connected component comprises at least one group of pixels and wherein a change in each of the pixels comprised in said at least one group of pixels is associated with a change in each of the remaining pixels of said at least one group of pixels; and
    (e) associating an interest level with said one or more connected components based upon a pre-determined set of criteria, thereby providing a rating of areas comprised within said video signal.

2. A method according to claim 1, further comprising a step of inserting one or more visual messages into one or more of said rated areas based upon an interest level associated therewith.

3. A method according to claim 1, further comprising a step dividing at least one object from among said second plurality of background objects into one or more connected components, thereby allowing to rate areas comprised in objects included in said second plurality of background objects.

4. A method according to claim 1, wherein an object that has been classified as a foreground object, retains this classification in each of the proceeding video frames that said object would appear in, for as long as that sequence of frames lasts.

5. A method according to claim 1, wherein an object which belongs to said third plurality of foreground objects is re-classified as a background object provided that no criteria for classifying an object as a foreground object are met for said object for at least a pre-defined number of consecutive video frames.

6. A method according to claim 1, further comprising a step of identifying areas comprised within objects included in said plurality of video frames that their respective rating has been changed along said video signal.

7. A method according to claim 6, wherein said change in the rating is of at least a pre-defined number of levels of interest.

8. A method according to claim 1, further comprising a step of matching at least one object from among said first plurality of objects to one or more pre-defined characterizing classes.

9. A method according to claim 8, further comprising a step of inserting one or more visual messages at one or more areas associated with said at least one object that matches the one or more pre-defined characterizing classes, and wherein said insertion is made in accordance with the respective level of interest of said area and the characterizing class with which said at least one object has been matched.

10. A non-transitory computer readable medium storing a computer program for executing a set of instructions by a computer system comprising one or more computer processors a process for rating areas comprised in video frames which are included in a video signal, the process comprising:

(a) selecting a frame from among a plurality of consecutive video frames comprised in a video signal provided, said frame being a selected frame;
(b) identifying a first plurality of objects comprised in said selected frame;
(c) upon comparing the selected frame with one or more of said plurality of consecutive video frames, deriving a second plurality of background objects and a third plurality of foreground objects;
(d) dividing at least one object from among said third plurality of foreground objects into one or more connected components; and
(e) associating an interest level with said one or more connected components based upon a pre-determined set of criteria, thereby providing a rating for areas comprised within said plurality of video frames.

11. A non-transitory computer readable medium according to claim 10, wherein said process further comprises a step of inserting one or more visual messages into one or more areas comprised within said plurality of video frames while complying with one or more pre-defined rating criteria.

12. A non-transitory computer readable medium according to claim 10, wherein said process further comprises a step of matching at least one object with one or more pre-defined characterizing classes.

13. A non-transitory computer readable medium according to claim 12, wherein said process further comprises a step of inserting one or more visual messages at one or more areas associated with said at least one object in accordance with a respective level of interest of said one or more areas and the characterizing class to which said at least one object has been matched.

* * * * *